United States Patent
Schmitt et al.

(10) Patent No.: US 11,118,721 B1
(45) Date of Patent: Sep. 14, 2021

(54) PIPE INSULATION SHIELD WITH ADAPTIVE RETAINING TABS

(71) Applicant: Seranum Holdings, Inc., Denver, CO (US)

(72) Inventors: Barry Schmitt, Castle Rock, CO (US); Mark Reardon, Aurora, CO (US)

(73) Assignee: Seranum Holdings, Inc., Denver, CO (US)

( * ) Notice: Subject to any disclaimer, the term of this patent is extended or adjusted under 35 U.S.C. 154(b) by 0 days.

(21) Appl. No.: 16/809,204

(22) Filed: Mar. 4, 2020

(51) Int. Cl.
*F16L 3/08* (2006.01)
*F16L 59/135* (2006.01)
*F16L 3/10* (2006.01)
*F16L 3/11* (2006.01)

(52) U.S. Cl.
CPC ........... *F16L 59/135* (2013.01); *F16L 3/1008* (2013.01); *F16L 3/11* (2013.01)

(58) Field of Classification Search
CPC ....... F16L 59/135; F16L 59/14; F16L 3/1008; F16L 3/11; F16L 3/08; F16L 3/12; E21F 17/02
USPC ......................................... 248/58, 62, 65, 73
See application file for complete search history.

(56) References Cited

U.S. PATENT DOCUMENTS

| | | | |
|---|---|---|---|
| 3,653,618 A * | 4/1972 | Kindorf | F16L 3/11 248/58 |
| 7,677,505 B2 | 3/2010 | Deichman | |
| 8,038,105 B2 | 10/2011 | Deichman | |
| 8,763,960 B1 * | 7/2014 | Moore | F16L 3/14 248/65 |
| 8,833,705 B2 * | 9/2014 | Bragagna | F16L 3/11 248/62 |
| 8,915,110 B1 | 12/2014 | Moore et al. | |
| 9,808,845 B2 | 11/2017 | Rebholz et al. | |
| 9,835,272 B1 * | 12/2017 | Handler | H02G 3/0437 |
| 9,903,524 B2 * | 2/2018 | Lange | F16L 3/11 |
| 10,071,508 B2 | 9/2018 | Botsolas, Jr. et al. | |
| 10,502,343 B2 * | 12/2019 | Juzak | F16L 3/137 |

OTHER PUBLICATIONS

"B-Line Series Pipe Hangers and Suports"; Eaton Catalog; Publication No. CA10001EN; Oct. 2019.
"Pipe Hangers & Devices—The Complete Line of Pipe Supports and Devices"; PHD Manufacturing, Inc; Catalog No. 493; Apr. 1993.
Value Engineered Products Catalog; Jun. 2017.

* cited by examiner

*Primary Examiner* — Nkeisha Smith
(74) *Attorney, Agent, or Firm* — Forge IP, PLLC

(57) ABSTRACT

A pipe insulation shield includes a metal sheet having first and second longitudinal edges, an arcuate shape from the first longitudinal edge to the second longitudinal edge, and first and second arcuate edges. The arcuate shape defines a channel with a lower portion that has first and second opposing, U-shaped apertures passing through it, which define opposing first and second metal tabs. Each of the first and second tabs is pivotable from a first position parallel to the lower portion of the sheet to a second position transverse to the lower portion of the sheet, and each of the first and second tabs pivots towards the other when pivoted from the first position to the second position. The tabs are sufficiently spaced apart from each other to accommodate different support structures. In advantageous embodiments, the four corners of sheet are rounded.

16 Claims, 11 Drawing Sheets

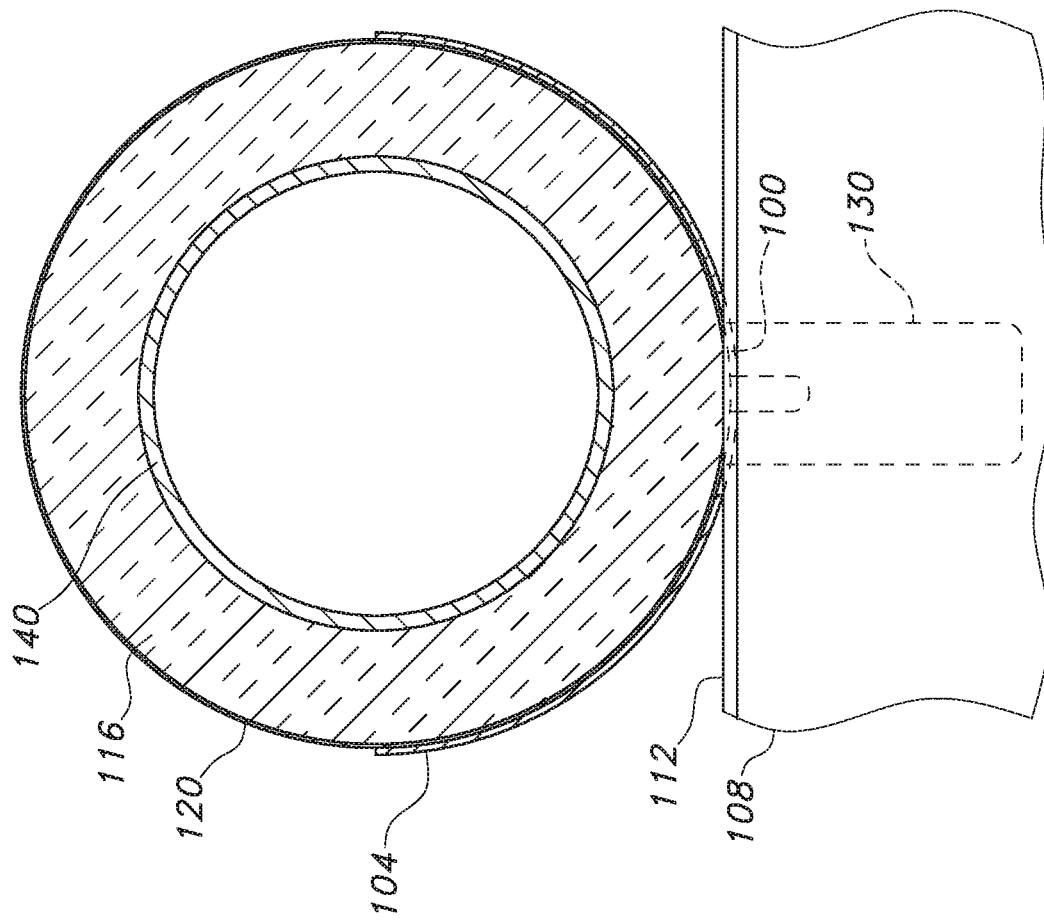
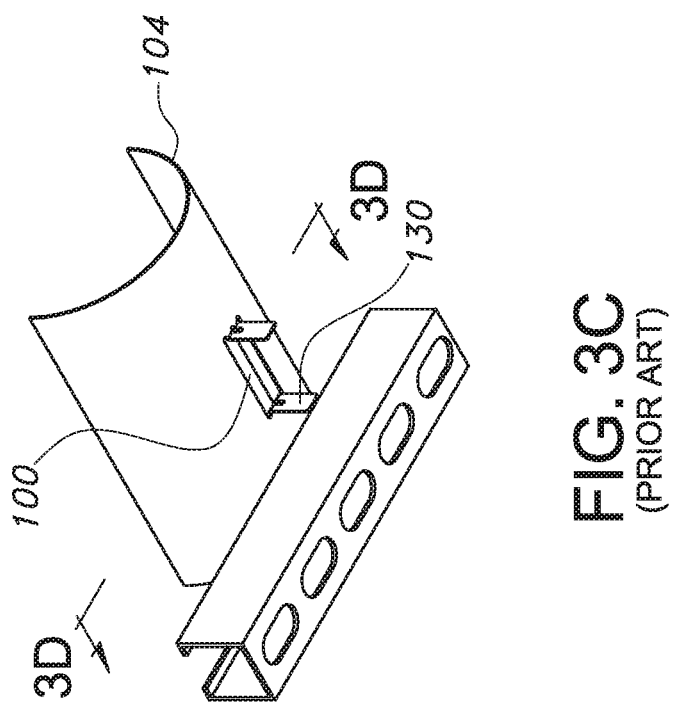
FIG. 3D (PRIOR ART)
FIG. 3C (PRIOR ART)

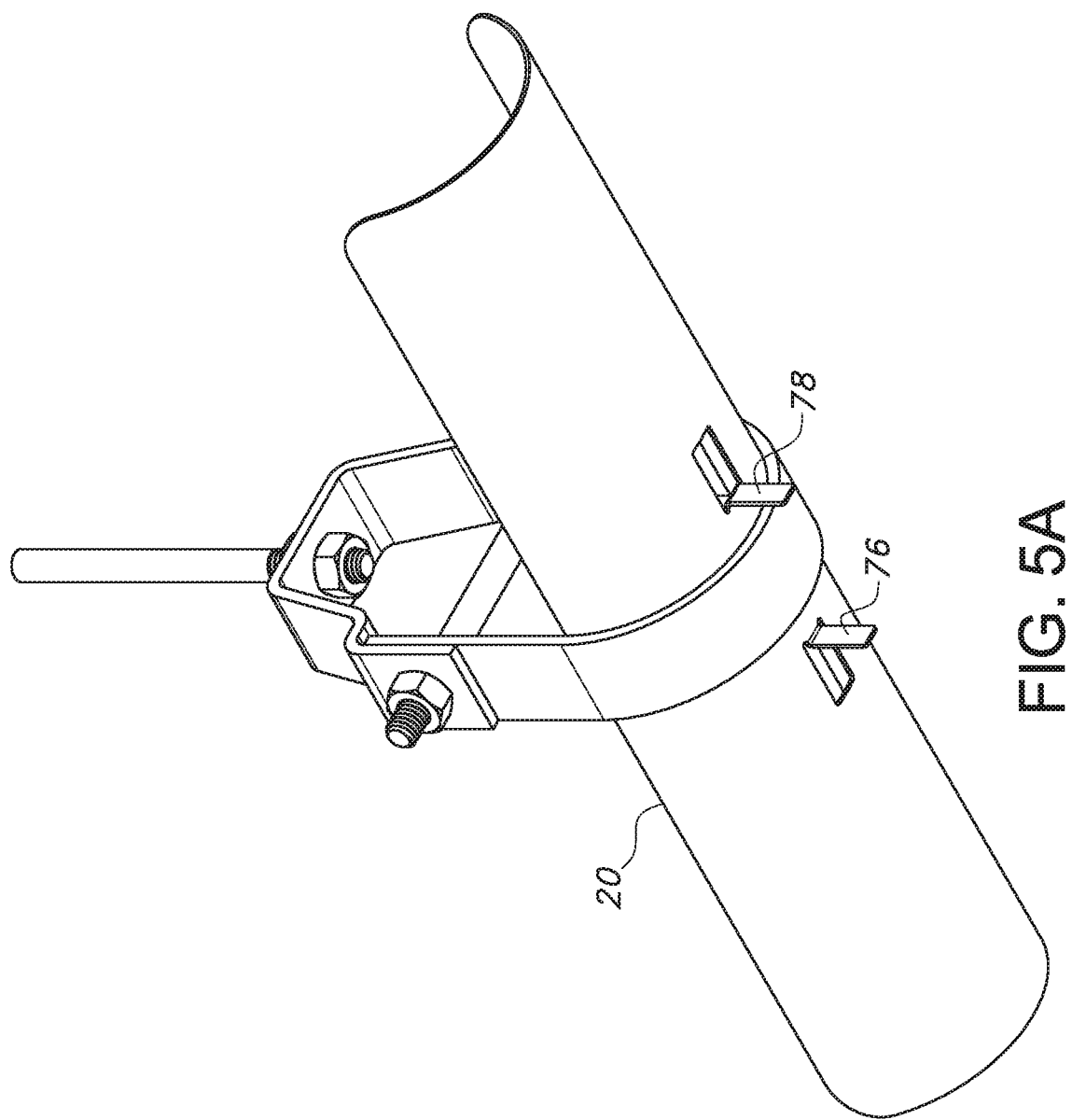

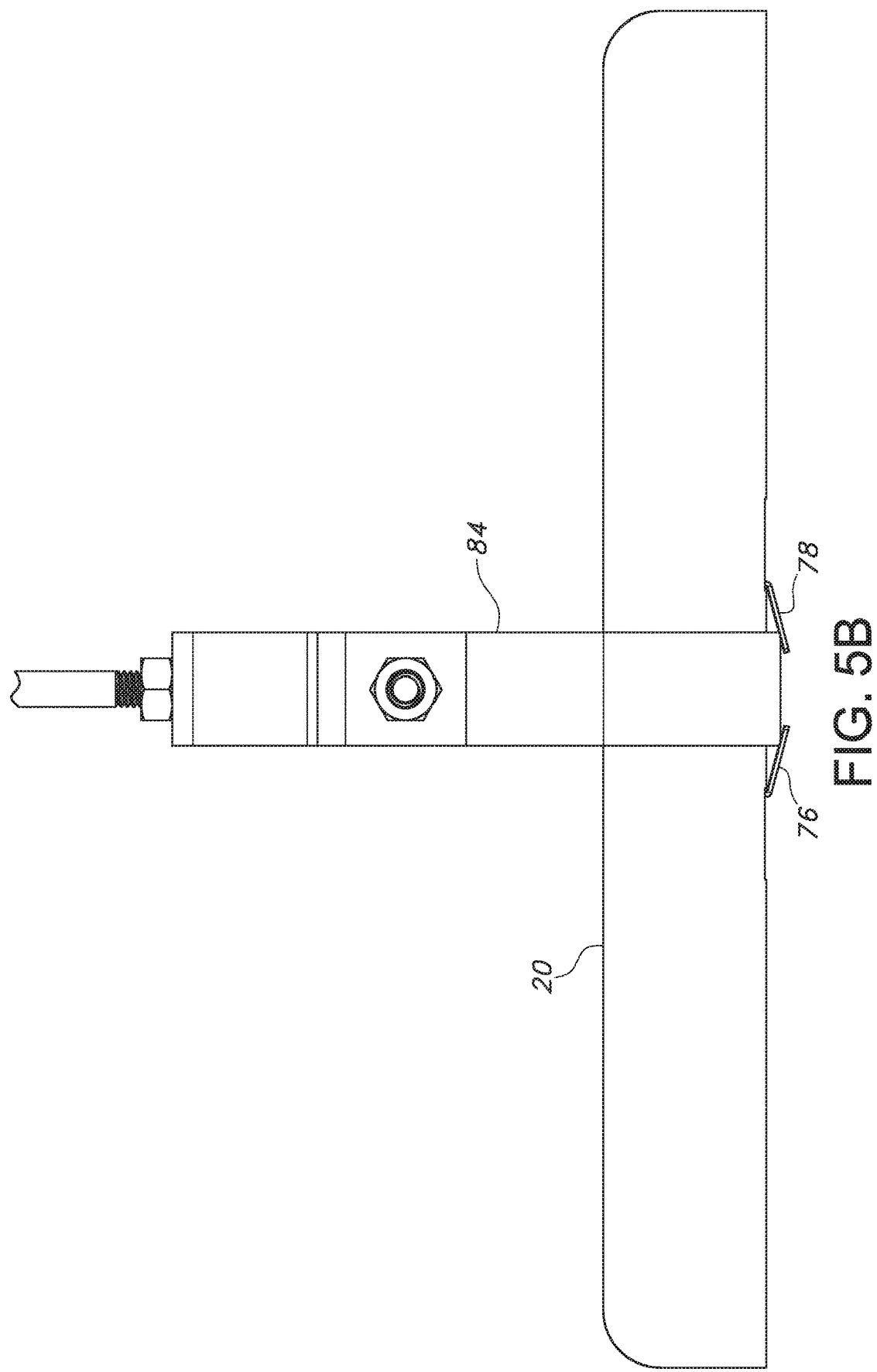

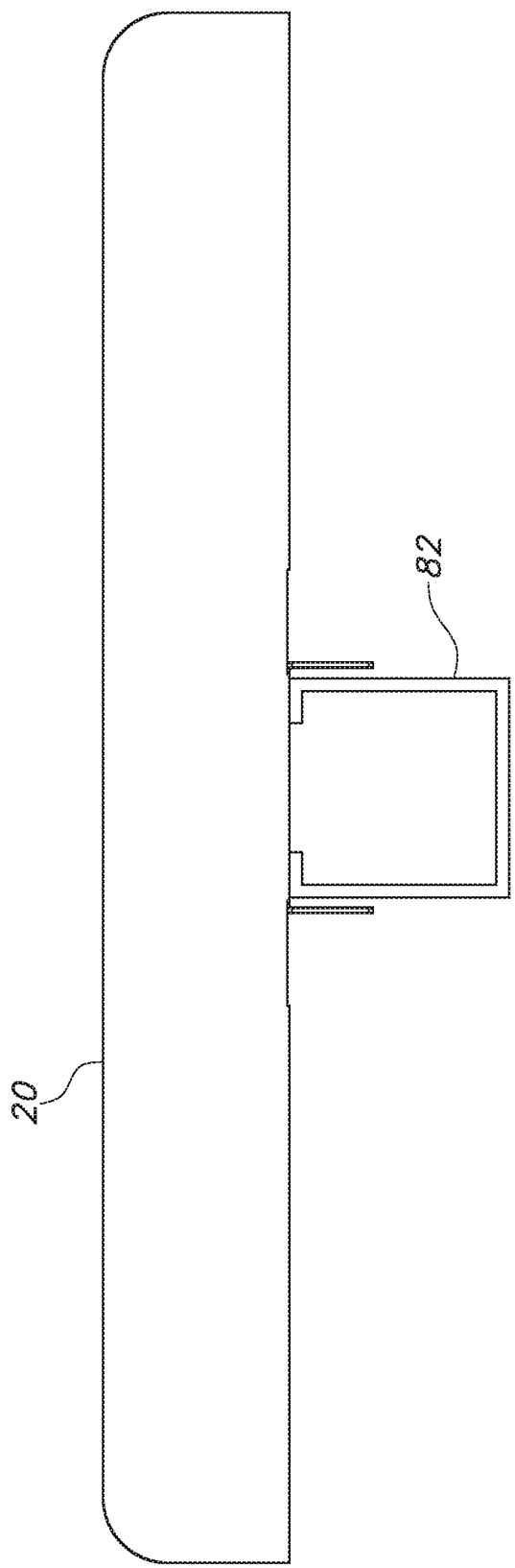

PIPE INSULATION SHIELD WITH ADAPTIVE RETAINING TABS

FIELD OF THE INVENTION

The present invention relates to insulation shields for pipes. More specifically, the invention relates to insulation shields with tabs that can be adapted so that the shield can be easily mounted on different types of pipe supports at the site of a pipe installation.

BACKGROUND OF THE INVENTION

In many construction scenarios, it is necessary to suspend pipes from a ceiling or other horizontal building surface. These pipes can be supported by various different types of strap, hanger, and strut support systems. For example, one common way of supporting a pipe is with a clevis hanger, which surrounds a pipe that passes therethrough, as shown in FIG. 1A. However, another way of suspending pipes is with a strut support system, which is a useful way of supporting a series of pipes, as shown in FIG. 1B.

Insulation protection shields are a common component of pipe installations in such construction projects. These devices, sometimes incorrectly referred to as saddles, are typically positioned underneath the pipe (and any insulation adjacent to the pipe) and above the support structure. The shield provides greater support for the pipe by distributing the force that would normally be exerted on a particular, small section of the pipe insulation (corresponding to the narrow clevis hanger supporting it) across a much larger portion of the pipe insulation, thereby reducing the likelihood of undue stress that can lead to damage over long periods of time. Additionally, by spreading out the load, the shield prevents drooping of plastic pipes, which will otherwise often sag between the hangers. Finally, the shield prevents abrasion of any insulation and vapor barrier around the pipe, which would otherwise inevitably experience damage in the area where it contacts the clevis hanger.

One problem with these shields, however, is that they will sometimes slide or rotate relative to the hanger, which results in a less stable support system and can facilitate undesirable movement of the pipe and/or insulation. Accordingly, additional means for securing the saddle to the hanger may be employed, but this not only requires additional materials and expense, but also requires additional steps by the individuals installing the shields, which both requires more time for installation and increases the chance of human error and subsequent failure of the anchoring system.

As a result, it has been suggested to modify the shield itself with ribs along the underside of the saddle that can engage the clevis hanger, such as, for example, the shield disclosed in U.S. Pat. No. 7,677,505 to Deichman, represented in FIG. 2. However, this type of saddle suffers from a number of disadvantages and shortcomings. First, these ribs form protrusions on the surface of the shield, which is undesirable. It is industry practice to ship and transport the shields in bulk, by the bucket or box, and protrusions on the outer surface of the shield make stacking difficult and require more space. Additionally, these ribs are necessarily small (in part to minimize the additional space required for the reason set forth above). As a result, these ribs are not always effective at preventing movement of the shield. Finally, and perhaps most significantly, these ribs are fixed protrusions designed for engaging a clevis hanger, and thus, cannot be adapted to the accommodate different pipe support structures used at the installation site.

It has alternatively been suggested to cut an H-shaped hole in the center of the shield, such that it forms two tabs that can be flexed over the bottom of a clevis hanger to lock the shield thereto, as shown in FIGS. 3A-B. However, this design also suffers from a number of disadvantages and shortcomings. First, as shown in FIG. 3C, this creates a large hole (100) in the center of the shield (104), and thus, decreased structural strength. This is precisely the location that support is most needed, where the shield engages the hanger or strut.

Moreover, this type of design renders the shield practically useless for installations employing a strut as the support structure, which, unlike a clevis hanger, does not have an arcuate surface corresponding to the arcuate shape of the shield. Therefore, as shown in FIG. 3D, when the shield (104) is positioned on the strut (108), the straight surface (112) of the strut will breach the curvature of the shield (104) via the large central hole. As a result, it will dig into and damage the insulation (116) around the pipe (140). Further, any vapor barrier (120), which is typically a very thin sheet that is often positioned between the shield (104) and the insulation (116), will simply be destroyed by the strut (108) extending through the hole.

A separate and additional challenge is that these shields are often fashioned out of metal. As a result, the corners of these shields are typically very sharp. In view of this, it is not uncommon for the individuals performing pipe installations to cut themselves while handling these shields, or for individuals who subsequently work at these sites to likewise experience minor injuries.

What is desired, therefore, is a device that can be installed at the site of a pipe installation to support the pipes and insulation and act as a shield against damage to the insulation. What is further desired is a pipe insulation shield that can be packaged, shipped to customers, and transported to installation sites without increasing the volume or weight of the device or compromising the structural integrity of the shield. What is also desired is a pipe insulation shield that has the versatility to be used for different types of support structures at the installation site. What is further desired is a pipe insulation shield that is not dangerous to those that are handling the shields or working in the vicinity thereof.

SUMMARY OF THE INVENTION

Accordingly, it is an object of the present invention to provide a pipe insulation shield that can be easily adapted to enable the shield to be mounted to the relevant pipe support structure at the installation site.

It is also an object of the present invention to provide such a pipe insulation shield that does not require additional components in order to mount the shield to the relevant support structure.

It is a further object of the present invention to provide such a pipe insulation shield that minimizes the amount of space required for the shield itself during times of shipping and transport prior to installation.

It is still another object of the present invention to provide such a pipe insulation shield that does not require removing the part of the shield wall that engages the support structure and the insulation.

It is yet another object of the present invention to provide such a pipe installation shield that does not have sharp edges.

In order to overcome the deficiencies of the prior art and to achieve at least some of the objects and advantages listed, the invention comprises a pipe insulation shield including a metal sheet having first and second longitudinal edges, the sheet having an arcuate shape from the first longitudinal edge to the second longitudinal edge and having first and second arcuate edges, the arcuate shape of the sheet defining a channel with a lower portion. The lower portion of the channel has a first aperture passing therethrough, the aperture having a U-shape such that it a first metal tab is defined thereby, and the lower portion of the channel has a second aperture passing therethrough, the second aperture being spaced apart from the first aperture and having a U-shape facing the opposite direction as the U-shape of the first aperture such that a second metal tab is defined thereby. Each of the first and second tabs is pivotable from a first position parallel to the lower portion of the sheet to a second position transverse to the lower portion of the sheet, and each of the first and second tabs pivots towards the other of the tabs when pivoted from the first position to the second position.

In certain advantageous embodiments, first and second tabs are each pivotable at least ninety degrees from the first position. In some of these embodiments, the first and second tabs are each pivotable greater than ninety degrees from the first position.

In some embodiments, the first and second tabs are separated by a distance of about 1.75 inches such that the width of a support strut can be accommodated between the first and second tabs when the tabs are in the second position. In some cases, the first and second tabs each have a length of about 0.75 inches such that, when the shield is mounted on a clevis hanger, the first and second tabs can be pivoted until a portion of each of the tabs extends under the hanger.

In certain embodiments, the first and second ends of the first arcuate edge join with the first and second longitudinal edges, respectively, via first and second rounded corners, and wherein the first and second ends of the second arcuate edge join with the first and second longitudinal edges, respectively, via third and fourth rounded corners.

In certain advantageous embodiments, the arcuate shape extends about 180 degrees. In some cases, the first longitudinal edge is substantially parallel to the second longitudinal edge, and the first and second arcuate edges are substantially perpendicular to the first and second longitudinal edges. In some embodiments, the length of the sheet from the first arcuate edge to the second arcuate edge is about twelve inches.

In certain embodiments, the sheet comprises steel. In some cases, the sheet comprises 22 gauge steel. In certain of these embodiments, the arcuate shape has an inner diameter between 2.0 and 5.5 inches. In other embodiments, the sheet comprises 18 gauge steel. In certain of these embodiments, the arcuate shape has an inner diameter between 2.0 and 14.0 inches.

BRIEF DESCRIPTION OF THE DRAWINGS

FIG. 3C is a perspective view of the prior art saddle of FIG. 3A being lowered onto a strut support.

FIG. 3D is a cross-sectional view of the prior art saddle of FIG. 3C mounted on the strut, taken along line 3D-3D of FIG. 3C.

FIG. 5A is a perspective view of the pipe insulation shield of FIG. 4C resting on a clevis hanger.

FIG. 5B is a perspective view of the pipe insulation shield of FIG. 5A with the tabs further pivoted underneath the clevis hanger.

FIG. 6 is a side view of the pipe insulation shield of FIG. 4C mounted to a strut.

DETAILED DESCRIPTION OF THE INVENTION

The following detailed description illustrates the technology by way of example, not by way of limitation, of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

Figure 1A:
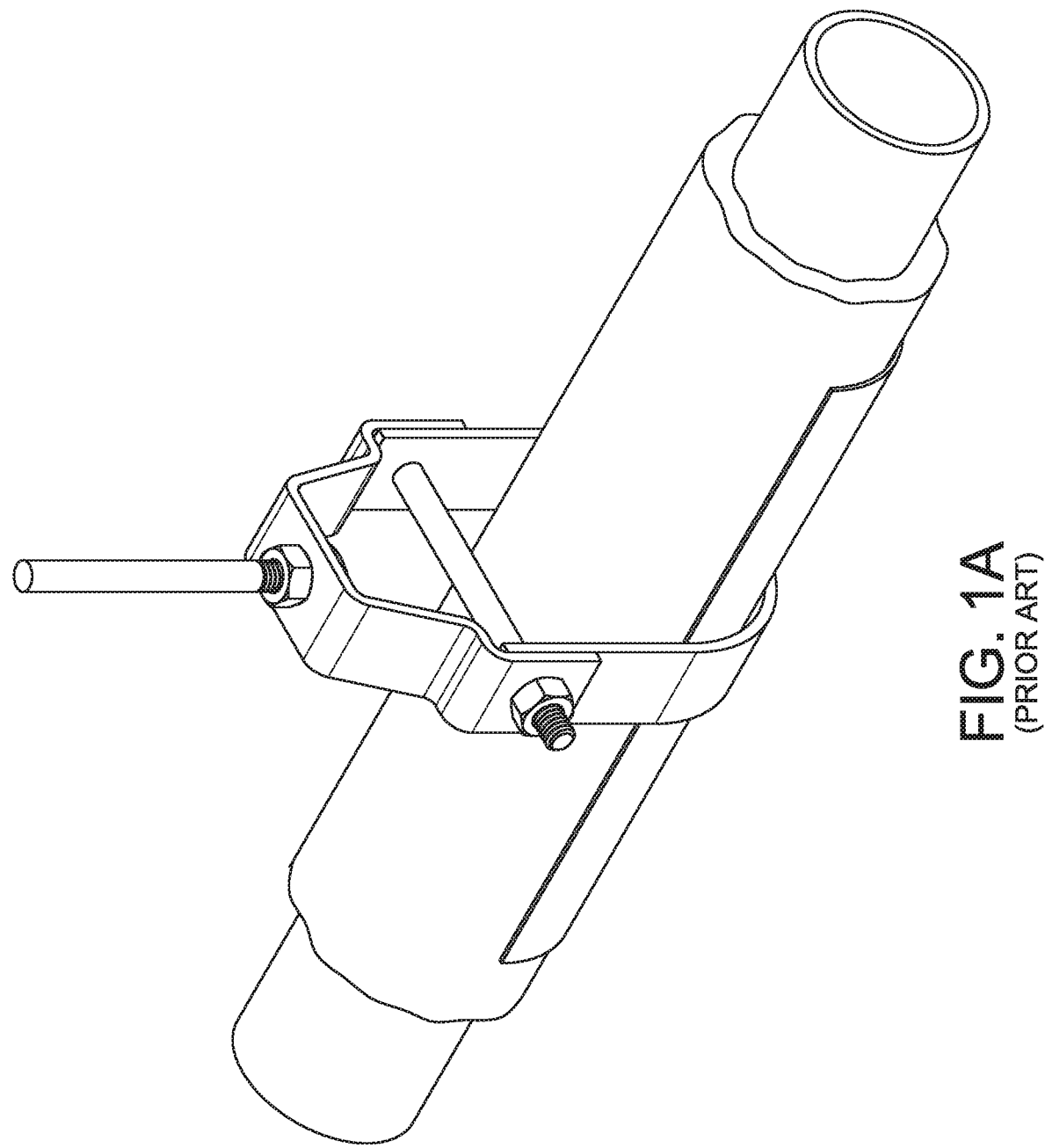
FIG. 1A is a perspective view of a prior art saddle used with a clevis hanger.
Figure 1B:
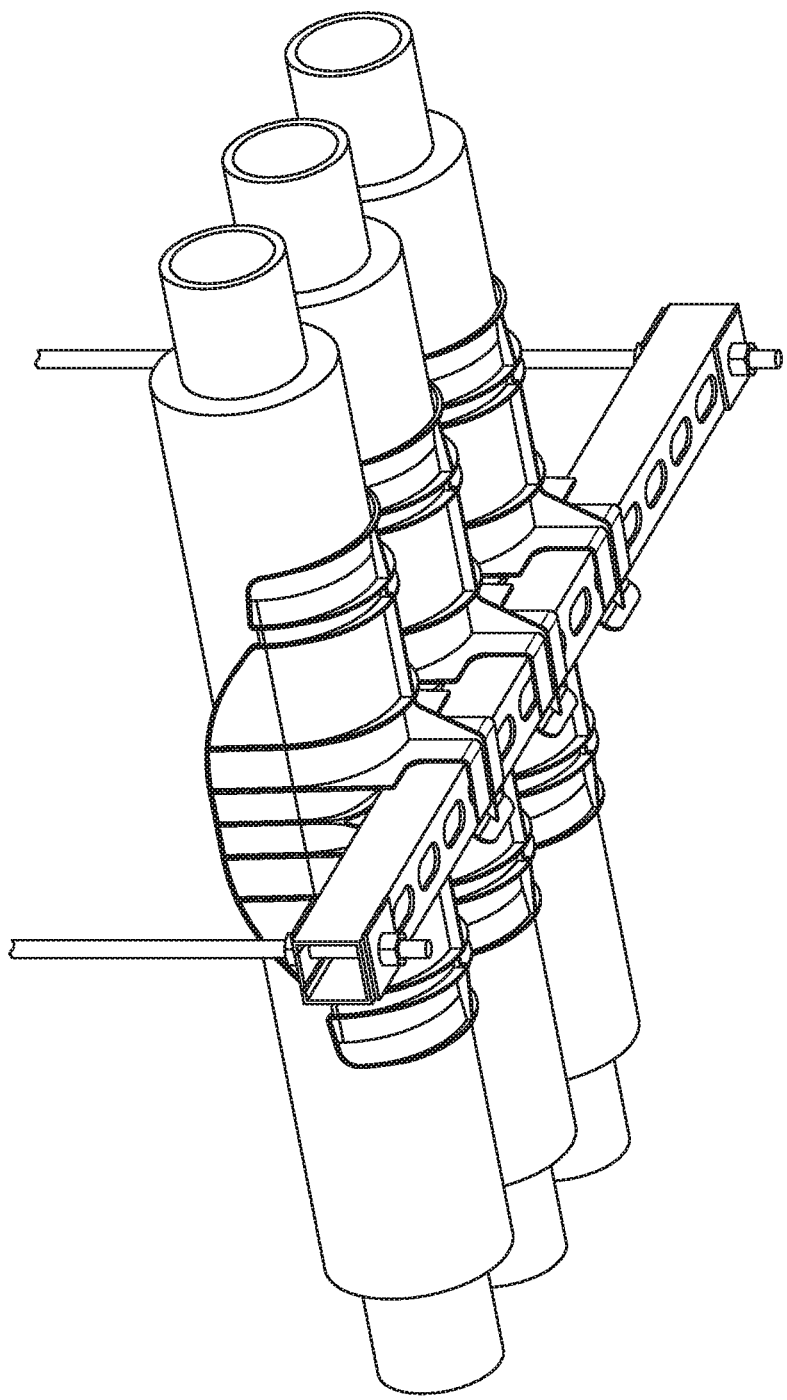
FIG. 1B is a perspective view of a prior art saddle used with a strut support.
Figure 2:
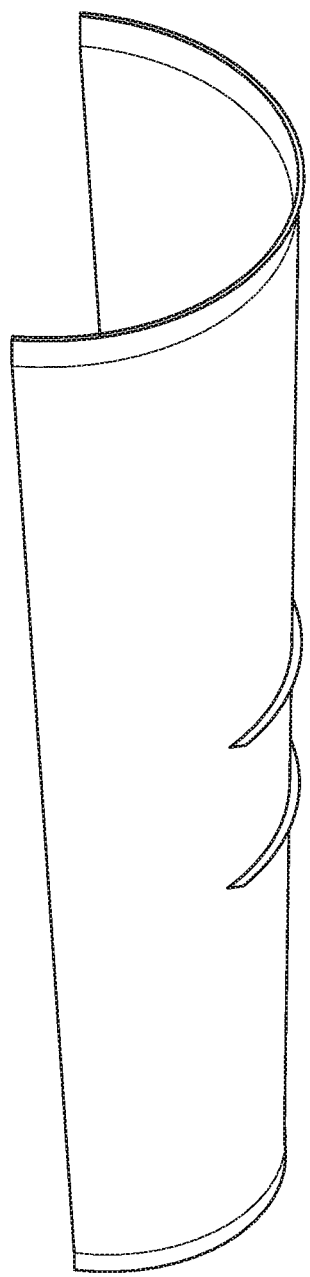
FIG. 2 is a perspective view of a prior art saddle employing ribs.
Figure 3B:
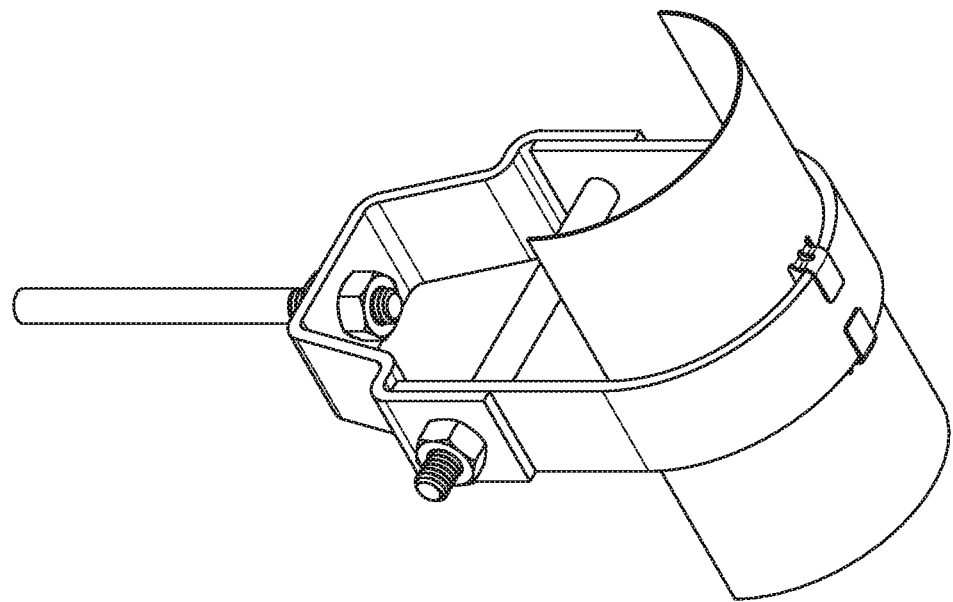
FIG. 3B is a perspective view of the prior art saddle of FIG. 3A with tabs flexed over the bottom of a clevis hanger.
Figure 3A:
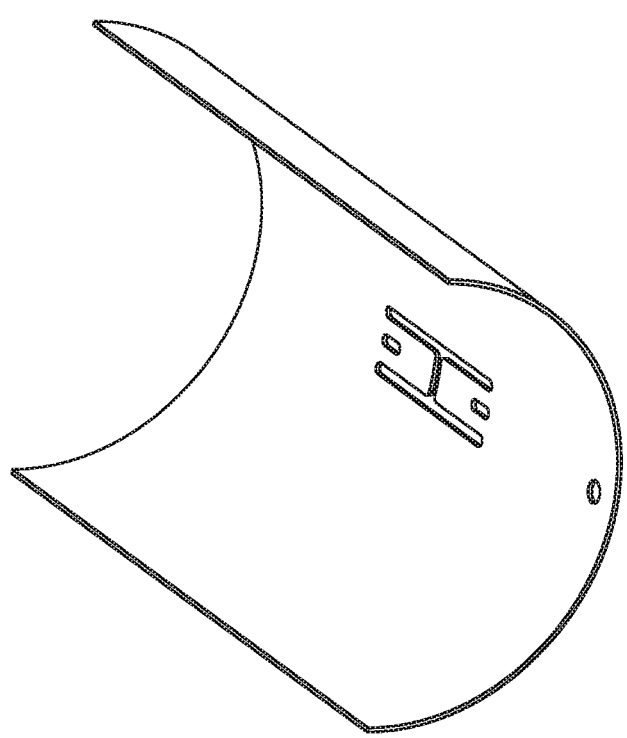
FIG. 3A is a perspective view of a prior art saddle employing a central aperture with tabs.
Figure 4A:
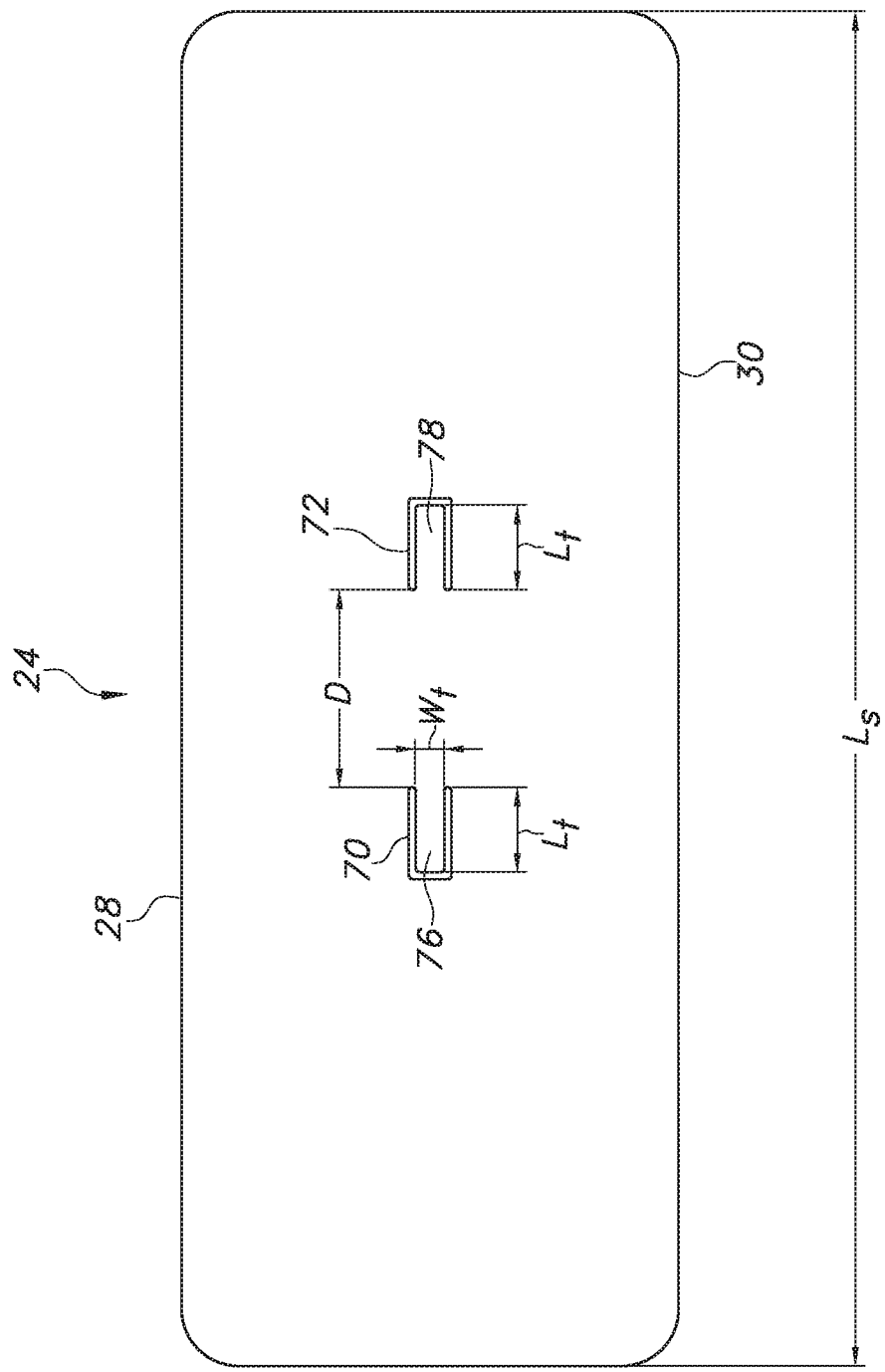
FIG. 4A is top view of a metal sheet prior to being rolled into the arcuate shield according to the invention.
Figure 4B:
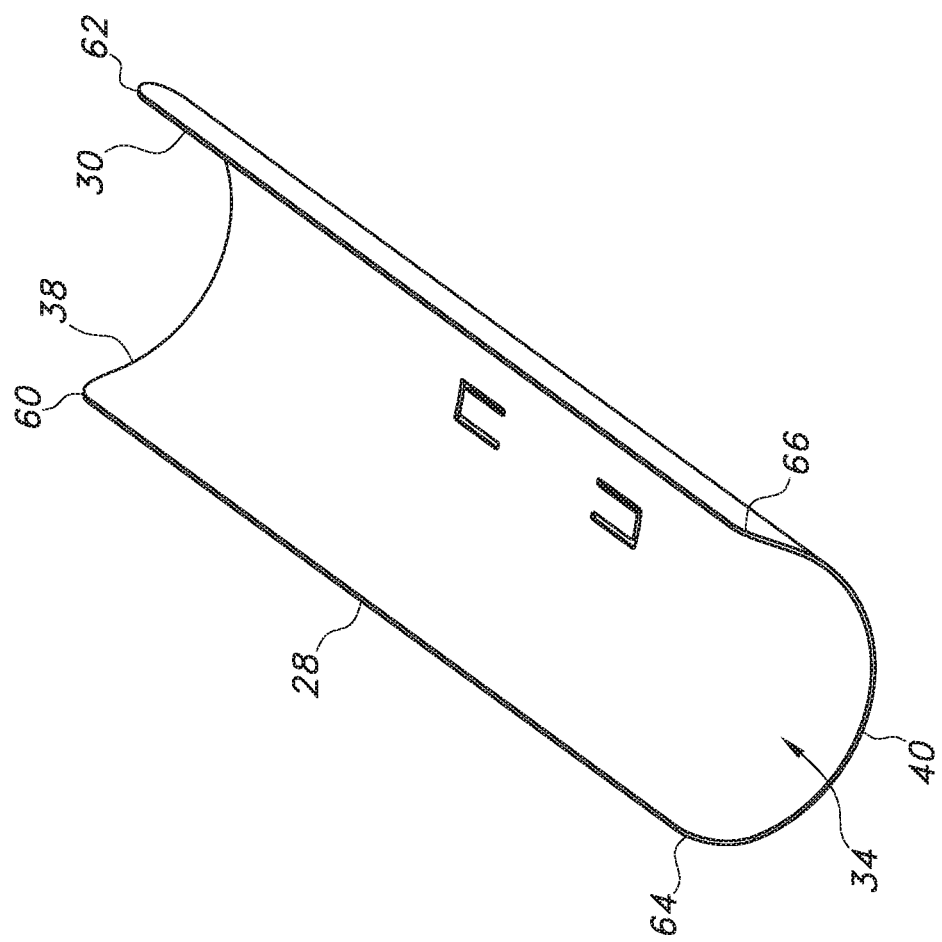
FIG. 4B is a perspective view of a pipe insulation shield in accordance with the invention.

FIGS. 4A-B illustrate one exemplary embodiment of a device (20) in accordance with the invention. Referring to FIG. 4A, the shield (20) is formed from a sheet of metal (24) which is cut and stamped as discussed further below, and which is generally rectangular. The sheet has first and second longitudinal edges (28, 30) along its length. In certain advantageous embodiments, the length $L_s$ of the sheet is about twelve inches.

During manufacture, the metal sheet (24) is rolled so that it has an arcuate shape from the first longitudinal edge (28) to the second longitudinal edge (30), as shown in FIG. 4B. Accordingly, the arcuate sheet (24) has first and second arcuate edges (38, 40), which are transverse to the first and second longitudinal edges (28, 30). Typically, the first and second longitudinal edges (28, 30) are substantially parallel to each other, and the first and second arcuate edges (38, 40) are in a plane substantially perpendicular to the longitudinal edges (28, 30).

Typically, the arcuate shape of the metal sheet (24) extends about 180 degrees. In advantageous embodiments, the metal sheet (24) is steel, typically cut and stamped from a roll of sheet metal. The thickness of the sheet (24) may be 22 gauge when the arcuate shape has an inner diameter between 2.0 and 5.5. inches, or 18 gauge when the arcuate shape has an inner diameter anywhere between 2.0 and 14.0 inches.

This arcuate shape of the metal sheet (24) defines a channel (34) that engages any pipe insulation and vapor barrier that surrounds the pipe when the shield is positioned underneath them. As previously described, this arcuate sheet (24) is inserted between the relevant pipe support, such as a clevis hanger or strut, and the insulation and vapor barrier wrapped around the pipe, thereby providing support for the pipe and acting as a shield to protect the pipe's surrounding insulation and vapor barrier from damage by the underlying pipe support.

In order to make the shields safer for individuals handing them during installation or later working at the site, as shown in FIG. 4A, the sharp corners are eliminated from the otherwise generally rectangular shape of the sheet (24) when it is cut during manufacturing. As a result, as shown in FIG. 4B, the first and second ends of the first arcuate edge (38) join the first and second longitudinal edges (28, 30), respectively, via first and second rounded corners (60, 62), and the first and second ends of the second arcuate edge (40) join with the first and second longitudinal edges (28, 30), respectively, via third and fourth rounded corners (64, 66).

During the manufacturing of the shield, the metal sheet (24) is stamped to produce first and second apertures (70, 72) passing through the sheet (24), as shown in FIG. 4A. The apertures (70, 72) each have a U-shape, such that they define first and second tabs (76, 78), respectively. The U-shaped apertures (70, 72) are mirror images of each other, facing in opposite directions, and arranged such that the tabs (76, 78) pivot toward each other when they are bent downwardly, as is further described below.

The first and second apertures (70, 72) are separate apertures spaced apart from one another such, such that the first and second tabs (76, 78) are separated by a distance D of about 1.75 inches. It is important that the tabs (76, 78) are separated by at least this distance in order to accommodate the width of a standard support strut positioned between them, as further described below.

The first and second tabs (76, 78) themselves have a length $L_t$ of about 0.75 inches long. It is important that the tabs (76, 78) are at least this long so that, when an installer needs to mount the shield to a hanger (instead of a strut), the tabs are of sufficient length to extend under the hanger, as is further described below. In certain embodiments, the tabs have a width $W_t$ of at least 0.25 inches to ensure that they are of adequate strength.

Figure 4C:
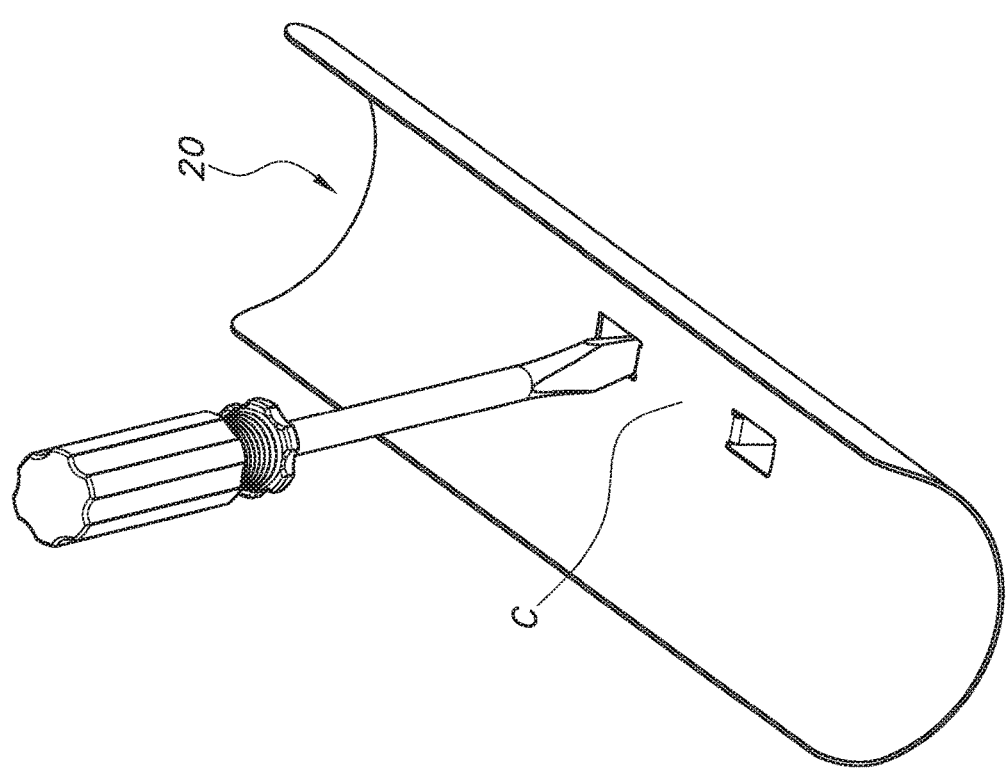
FIG. 4C is a perspective view of the pipe insulation shield of FIG. 4B with the tabs being pivoted from a flat position to a perpendicular position.

As shown if FIG. 4C, once in the field, the individual installing the shield can bend the tabs (76, 78) downwardly, for example, with a screwdriver. In this way, the tabs (76, 78) can each be pivoted from their original position, in which they are parallel to the lower portion of the shield (20), to a second position, which is transverse to the lower portion of the shield (20). When pivoted from the first position to the second position, the tabs (76, 78) pivot towards each other, or in another words, towards the center (C) of the shield (20).

The tabs (76, 78) can be pivoted at least ninety degrees such that they can engage the relevant support structure. For example, as shown in FIG. 6, if the shield (20) is mounted on a support strut (82), the tabs (76, 78) are typically pivoted about ninety degrees, such that the tabs (76, 78) are substantially perpendicular to the original position of the tabs (76, 78) and abut the walls of the strut (82) to secure it thereto. As noted above, the tabs (76, 78) are specifically spaced at distance that accommodates the width of the strut to allow for this type of installation.

Alternatively, as shown in FIGS. 5A-B, if the shield (20) is mounted to a hanger, such as a clevis hanger, the tabs (76, 78) can be rotated more than ninety degrees such that part of the tab wraps around under the hanger (84) for a secure fit. As noted above, the tabs (76, 78) are specifically sized to also allow for this type of application.

Though the distance D between the tabs (76, 78) can be positioned farther apart the dimension noted above, this would likewise require that the length $L_t$ of the tabs (76, 78) also be longer than the dimension described above, such that that the tabs, when fully pivoted, would still reach the underside of a clevis hanger (84) when used in that type of application. However, the above-described dimensions of the distance D between tabs (76, 78) and length $L_t$ of the tabs are preferred, as this maximizes the stability of the shield (20) when mounted, while still permitting the shield to be used for both strut and clevis hanger applications. In this way, the versatility of the shield (20) for different installation types is maximized.

It should be understood that the foregoing is illustrative and not limiting, and that obvious modifications may be made by those skilled in the art without departing from the spirit of the invention. Although the invention has been described with reference to embodiments herein, those embodiments do not limit the scope of the invention. Accordingly, reference should be made primarily to the accompanying claims, rather than the foregoing specification, to determine the scope of the invention.

What is claimed is:

1. A pipe insulation shield, comprising:
   a metal sheet having first and second longitudinal edges, the sheet having an arcuate shape from the first longitudinal edge to the second longitudinal edge and having first and second arcuate edges, the arcuate shape of the sheet defining a channel with a lower portion;
   wherein the lower portion of the channel has a first precut aperture passing therethrough, the first precut aperture having a U-shape passing through the metal sheet and defining a first metal tab having a first end connected to the metal sheet, an unconnected second end opposite thereto, and a straight body extending from the connected first end to the unconnected second end thereof;
   wherein the lower portion of the channel has a second precut aperture passing therethrough, the second precut aperture being spaced apart from the first aperture and having a U-shape passing through the metal sheet facing the opposite direction as the U-shape of the first aperture and defining a second metal tab having a first end connected to the metal sheet, an unconnected second end opposite thereto, and a straight body extending from the connected first end to the unconnected second end thereof;
   wherein each of said first and second tabs bends at the connected first end of said tabs between a first position, in which the straight body extending from the connected first end to the unconnected second end of said tab is parallel to the lower portion of the sheet, and a second position, in which the straight body extending from the connected first end to the unconnected second end of said tab is perpendicular to the lower portion of the sheet; and
   when in the second position, the unconnected second ends of said first and second tabs pivot toward each other and are closer to each other but farther from the lower portion of the sheet than when in the first position.

2. The pipe insulation shield of claim 1, wherein said first and second tabs are each pivotable greater than ninety degrees from the first position.

3. The pipe insulation shield of claim 1, wherein the first and second tabs are separated by a distance of about 1.75 inches such that a width of a support strut can be accommodated between the first and second tabs when said tabs are in the second position.

4. The pipe insulation shield of claim 3, wherein said first and second tabs each have a length of about 0.75 inches such that, when the shield is mounted on a clevis hanger, the first and second tabs can be pivoted until a portion of each of said tabs extends under the hanger.

5. The pipe insulation shield of claim 1, wherein said first and second tabs each have a length of about 0.75 inches such that, when the shield is mounted on a clevis hanger, the first and second tabs can be pivoted until a portion of each of said tabs extends under the hanger.

6. The pipe insulation shield of claim 1, wherein the first and second ends of the first arcuate edge join with the first and second longitudinal edges, respectively, via first and second rounded corners, and wherein the first and second ends of the second arcuate edge join with the first and second longitudinal edges, respectively, via third and fourth rounded corners.

7. The pipe insulation shield of claim 1, wherein the arcuate shape extends about 180 degrees.

8. The pipe insulation shield of claim 1, wherein the first longitudinal edge is substantially parallel to the second longitudinal edge, and the first and second arcuate edges are substantially perpendicular to the first and second longitudinal edges.

9. The pipe insulation shield of claim 1, wherein the length of the sheet from the first arcuate edge to the second arcuate edge is about twelve inches.

10. The pipe insulation shield of claim 1, wherein the sheet comprises steel.

11. The pipe insulation shield of claim 10, wherein the sheet comprises 22 gauge steel.

12. The pipe insulation shield of claim 11, wherein the arcuate shape has an inner diameter between 2.0 and 5.5 inches.

13. The pipe insulation shield of claim 10, wherein the sheet comprises 18 gauge steel.

14. The pipe insulation shield of claim 13, wherein the arcuate shape has an inner diameter between 2.0 and 14.0 inches.

15. The pipe insulation shield of claim 1, wherein each of said first and second tabs is coaxial with the lower portion of the sheet when in the first position and not coaxial with the lower portion of the sheet when in the second position.

16. The pipe insulation shield of claim 15, wherein the first and second ends of the first arcuate edge join with the first and second longitudinal edges, respectively, via first and second rounded corners, and wherein the first and second ends of the second arcuate edge join with the first and second longitudinal edges, respectively, via third and fourth rounded corners.

* * * * *